(12) United States Patent  
Kadowaki

(10) Patent No.: US 9,982,744 B2  
(45) Date of Patent: May 29, 2018

(54) LIQUID-SEALED VIBRATION DAMPING DEVICE

(71) Applicant: Yamashita Rubber Co., Ltd., Fujimino (JP)

(72) Inventor: Hirokazu Kadowaki, Saitama (JP)

(73) Assignee: Yamashita Rubber Co., Ltd., Fujimino (JP)

( * ) Notice: Subject to any disclaimer, the term of this patent is extended or adjusted under 35 U.S.C. 154(b) by 0 days. days.

(21) Appl. No.: 15/474,537

(22) Filed: Mar. 30, 2017

(65) Prior Publication Data

US 2017/0284501 A1 Oct. 5, 2017

(30) Foreign Application Priority Data

Mar. 31, 2016 (JP) .............................. JP2016-072389

(51) Int. Cl.
*F16F 13/10* (2006.01)
*B60K 5/12* (2006.01)
*F16F 15/02* (2006.01)

(52) U.S. Cl.
CPC ............ *F16F 13/10* (2013.01); *B60K 5/1208* (2013.01); *F16F 15/022* (2013.01)

(58) Field of Classification Search
CPC ........ F16F 13/10; F16F 15/022; B60K 5/1208
See application file for complete search history.

(56) References Cited

U.S. PATENT DOCUMENTS

2012/0018936 A1* 1/2012 Ogasawara ........... F16F 13/106
267/140.13

FOREIGN PATENT DOCUMENTS

JP 2009092137 A 4/2009

* cited by examiner

*Primary Examiner* — Vishal R Sahni
(74) *Attorney, Agent, or Firm* — Grumbles Law PLLC

(57) ABSTRACT

A liquid-sealed vibration damping device is provided that allows an outer cylindrical member to have a substantially uniform interference margin in the circumferential direction, while improving an assembling property. A second mounting member mounted on a non-vibration source includes: a first frame in a cylindrical shape that is connected to a lower portion of an insulator; a second frame in a cylindrical shape that holds a partition member arranged below the insulator; and a connector that connects the first frame with the second frame. The connector includes: engaging parts that are arranged on the first frame; and elastic hook parts that are arranged on the second frame. The elastic hook parts are arranged at intervals on each of main frame parts in the circumferential direction thereof, and the elastic hook parts arranged on corners have lower rigidity than those arranged on the main frame parts.

9 Claims, 11 Drawing Sheets

LIQUID-SEALED VIBRATION DAMPING DEVICE

CROSS-REFERENCE TO RELATED APPLICATION

This application claims the benefit of priority to Japanese Patent Application No. 2016-072389 filed 31 Mar. 2016, the disclosures of all of which are hereby incorporated by reference in their entireties.

TECHNICAL FIELD

The present disclosure relates to a liquid-sealed vibration damping device for a vehicle.

BACKGROUND OF THE INVENTION

Japanese Patent Application Publication No. 2009-092137 (hereinafter referred to as Patent Document 1) discloses a well-known liquid-sealed vibration damping device in the same category as the present disclosure. This liquid-sealed vibration damping device is arranged with a circular partition member that partitions a main liquid chamber and an auxiliary liquid chamber so as to absorb the internal pressure in the main liquid chamber.

This liquid-sealed vibration damping device includes a first mounting part that is mounted on the engine and a second mounting part that is mounted on the vehicle body, wherein an insulator is interposed between the first and second mounting parts. The second mounting part is an outer cylindrical member that is arranged so as to surround the periphery of the insulator, and includes a first frame and a second frame that is connected to the first frame. The partition member is arranged under the first frame. The second frame covers the periphery of the partition member.

The first frame is formed to have recesses for engagement on the outer peripheral surface along the circumferential direction. In contrast, the second frame is formed to have claw-shaped protrusions to be engaged with the recesses of the first frame. The outer cylindrical member is easily assembled by engaging the protrusions of the second frame with the recesses of the first frame.

Incidentally, as an engine room of a vehicle is designed smaller, a liquid-sealed vibration damping device is also required to be smaller. In general, a liquid-sealed vibration damping device, inclusive of the one disclosed in Patent Document 1, has a circular outer shape in a plan view, likely to cause space efficiency to be reduced. Then, as a result of taking space saving into account, a liquid-sealed vibration damping device has been studied that has a substantially quadrangular outer shape in a plan view. In this liquid-sealed vibration damping device, the partition member is preferably formed also to have a substantially quadrangular shape in a plan view to secure an area for obtaining high damping performance.

Normally, forming an outer cylinder member so as to have a substantially quadrangular shape in a plan view makes corners of the outer cylinder member to have high rigidity, while it makes linear sections of the same to have lower rigidity than the rigidity on the corners. This causes a problem that, if the outer cylinder member is formed to have a structure of engaging the protrusions of the second frame with the recesses of the first frame as with the above-described Patent Document 1, the protrusions will have variations in rigidity to create difficulty in making an interference margin between the first and second frames substantially uniform in the circumferential direction. This problem is not limited to a liquid-sealed vibration damping device having the outer cylindrical member formed in a substantially quadrangular shape in a plan view, and rather it is a common problem which also occurs in a liquid-sealed vibration damping device inclusive of any outer cylindrical member in a shape of having linear parts and corners which continue to the linear parts.

A solution is needed that can solve the above-identified problems to provide a liquid-sealed vibration damping device that allows an outer cylindrical member to have a substantially uniform interference margin in the circumferential direction, while improving an assembling property.

SUMMARY OF THE INVENTION

In one non-limiting embodiment of the present disclosure, a liquid-sealed vibration damping device for solving the above-described problem includes: a first mounting member that is mounted on a vibration source; a second mounting member that is mounted on a non-vibration source; and an insulator that is interposed between the first and second mounting members. The second mounting member includes: a first frame in a cylindrical shape that is connected to a lower portion of the insulator; a second frame in a cylindrical shape that holds a partition member which is arranged below the insulator; and a connector that connects the first frame with the second frame. The connector includes: engaging parts that are arranged on either one of the first and second frames; and elastic hook parts that are arranged on the other one of the first and second frames to engage with the engaging parts. The first or second frame, which is arranged with the elastic hook parts, includes a pair of main frame parts in a linear shape that faces each other, and a pair of side frame parts that connects ends of the main frame parts. The elastic hook parts are arranged at intervals on each of the main frame parts in the circumferential direction of the said first or second frame, and are also arranged on corners between the main frame parts and the side frame parts, wherein the elastic hook parts arranged on the corners have lower rigidity than those arranged on the main frame parts.

Here, the "rigidity" refers to, on the main frame part, a level of tolerance for being deformed by a force of deforming the elastic hook part outward from the main frame part. Also, it refers to, on the corner, a level of tolerance for being deformed by a force when deforming the elastic hook part outward from the corner.

With such a liquid-sealed vibration damping device, engaging parts arranged on either one of the first and second frames are engaged with elastic hook parts arranged on the other one of the first and second frames to facilitate assembling the second mounting member as the cylindrical member. As for the second mounting member, the elastic hook part having high rigidity is arranged on the main frame part having low rigidity for a frame, and the elastic hook part having low rigidity is arranged on the corner having high rigidity for a frame, to allow the elastic hook parts practically to have uniform rigidity in the circumferential direction of the frame. Therefore, the liquid-sealed vibration damping device allows the outer cylindrical member to have a substantially uniform interference margin in the circumferential direction, while improving an assembling property. This improves a sealing property of the outer cylindrical member.

In another non-limiting embodiment, the liquid-sealed vibration damping device includes: a first mounting member that is mounted on a vibration source; a second mounting member as an outer cylindrical member that is mounted on a non-vibration source; and an insulator that is interposed between the first and second mounting members. The second mounting member includes: a first frame in a cylindrical shape that is connected to a lower portion of the insulator; a second frame in a cylindrical shape that holds a partition member which is arranged below the insulator; and a connector that connects the first frame with the second frame. The connector includes: engaging parts that are arranged on either one of the first and second frames; and elastic hook parts that are arranged on the other one of the first and second frames to engage with the engaging parts. The first or second frame, which is arranged with the elastic hook parts, includes a pair of main frame parts in a linear shape that faces each other, and a pair of side frame parts that connects ends of the main frame parts. The elastic hook parts are arranged at intervals on each of the main frame parts in the circumferential direction of the said first or second frame. Among the elastic hook parts, the elastic hook parts arranged at the ends of the main frames have lower rigidity than those arranged at positions away from the ends.

Here, the "rigidity" refers to a level of tolerance for being deformed by a force of deforming the elastic hook part outward from the main frame part.

With such a liquid-sealed vibration damping device, engaging parts arranged on either one of the first and second frames are engaged with elastic hook parts arranged on the other one of the first and second frames to facilitate assembling the second mounting member as the outer cylindrical member. As for the second mounting member, the elastic hook part having highly rigidity is arranged on a part of the main frame having low rigidity, and the elastic hook part having low rigidity is arranged at the end of the main frame having high rigidity, to allow the elastic hook parts practically to have uniform rigidity in the circumferential direction of the outer cylindrical member. Therefore, the liquid-sealed vibration damping device allows the outer cylindrical member to have a substantially uniform interference margin in the circumferential direction, while improving an assembling property. This improves a sealing property of the outer cylindrical member.

In yet another non-limiting embodiment, the liquid-sealed vibration damping device includes: a first mounting member that is mounted on a vibration source; a second mounting member as an outer cylindrical member that is mounted on a non-vibration source; and an insulator that is interposed between the first and second mounting members. The second mounting member includes: a first frame in a cylindrical shape that is connected to a lower portion of the insulator; a second frame in a cylindrical shape that holds a partition member which is arranged below the insulator; and a connector that connects the first frame with the second frame. The connector includes: engaging parts that are arranged on either one of the first and second frames; and elastic hook parts that are arranged on the other one of the first and second frames to engage with the engaging parts, and the first or second frame, which is arranged with the elastic hook parts, includes a low rigidity part having low rigidity and a high rigidity part having higher rigidity than the low rigidity part, wherein the elastic hook parts are arranged at intervals on the said first or second frame, which is arranged with the elastic hook parts, in the circumferential direction thereof, and the elastic hook parts arranged on the high rigidity part have lower rigidity than those arranged on the low rigidity part.

Here, the "rigidity" refers to, on the frame arranged with the elastic hook parts, a level of tolerance for being deformed by a force of deforming the elastic hook part outward from the frame.

With such a liquid-sealed vibration damping device, engaging parts arranged on either one of the first and second frames are engaged with elastic hook parts arranged on the other one of the first and second frames to facilitate assembling the second mounting member as the outer cylindrical member. As for the second mounting member, the elastic hook part having high rigidity is arranged on the low rigidity part having low rigidity for a frame, and the elastic hook part having low rigidity is arranged on the high rigidity part having high rigidity for a frame, to make the elastic hook part to have uniform rigidity in the circumferential direction of the outer cylindrical member. Therefore, the liquid-sealed vibration damping device allows the outer cylindrical member to have a substantially uniform interference margin in the circumferential direction, while improving an assembling property. This improves a sealing property of the outer cylindrical member.

Further, in the above-described liquid-sealed vibration damping device, if the elastic hook part includes: a leg part that extends toward the engaging part; and a tip part that is arranged at a tip of the leg part and engaged with the engaging part, the elastic hook part having low rigidity is preferably formed to have a longer leg part than that having higher rigidity. In this way, the elastic hook part having low rigidity can easily be formed.

Moreover, in the above-described liquid-sealed vibration damping device, the elastic hook part having low rigidity is preferably formed thinner than that having higher rigidity. In this way, the elastic hook part having low rigidity can easily be formed.

Advantageous Effects of the Invention

According to the present disclosure, a liquid-sealed vibration damping device is obtained that allows the outer cylindrical member to have a substantially uniform interference margin in the circumferential direction, while improving an assembling property.

The above summary is not intended to describe each and every example or every implementation of the disclosure. The Description that follows more particularly exemplifies various illustrative embodiments.

DETAILED DESCRIPTION

Hereinafter, descriptions will be given of embodiments of liquid-sealed vibration damping devices according to the present disclosure, with reference to the drawings. Note that when a reference is made to "front-rear," "up-down," or "right-left" in the following description, it refers to the direction shown in FIG. 1, but "front-rear" does not necessarily coincide with the longitudinal direction with respect to the vehicle body of an automobile. In the description, the same symbols are used for the same elements, and duplicate descriptions thereof will be omitted. Predominant vibration will be inputted to the liquid-sealed vibration damping device from the up-down direction.

First Embodiment

Figure 1:
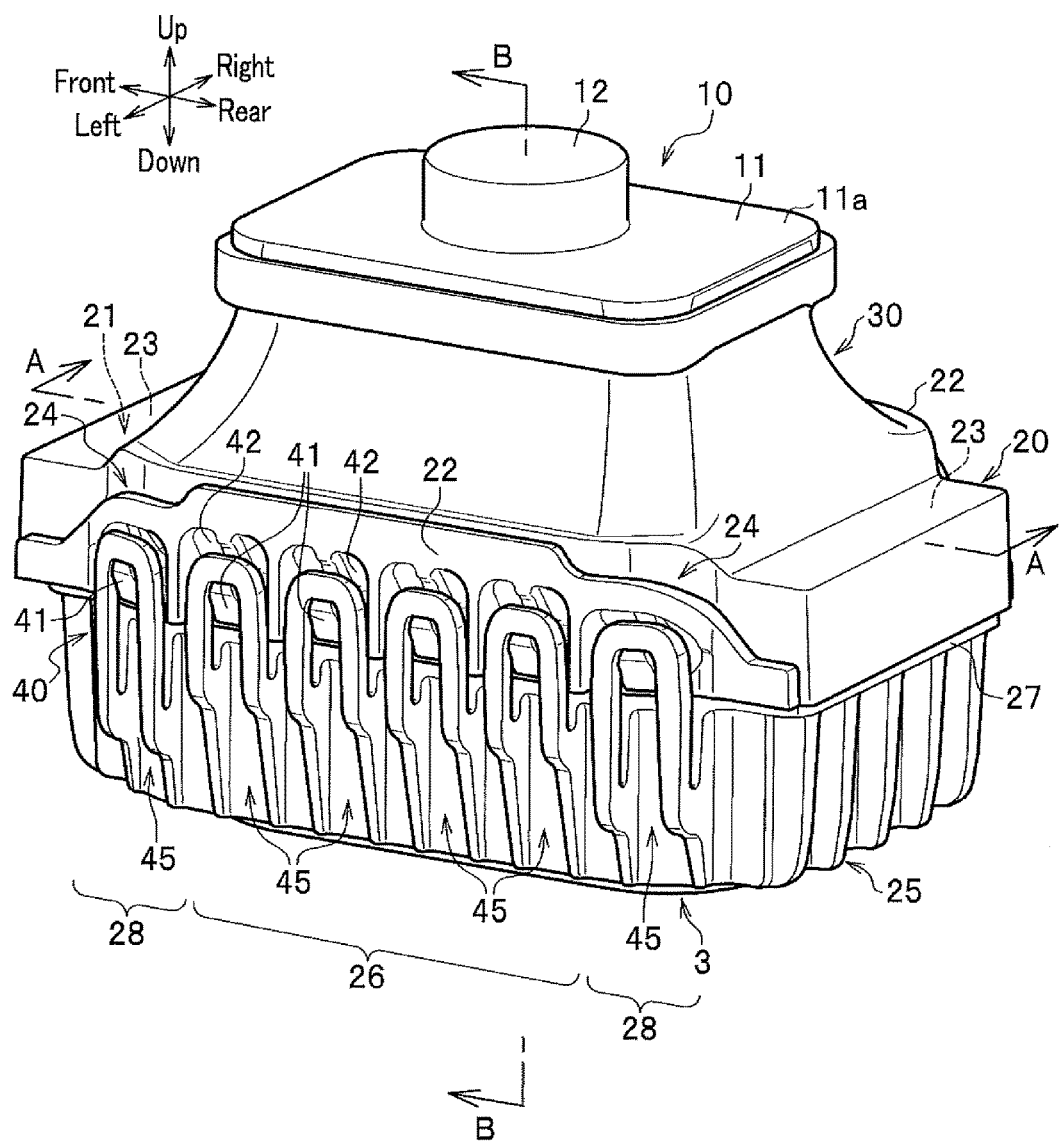
FIG. 1 is a perspective view of a liquid-sealed vibration damping device according to a first embodiment of the present disclosure.

A liquid-sealed vibration damping device is a liquid-sealed type and includes: a first mounting member 10; a second mounting member 20; and an insulator 30 that is interposed therebetween, as shown in FIG. 1. The first mounting member 10 is mounted on an engine (not shown) which is a vibration source. The second mounting member is mounted on the vehicle body (not shown) which is a non-vibration source to receive the vibration. The liquid-sealed vibration damping device has a substantially rectangular shape in a plan view, with the long side in the front-rear direction and the short side in the right-left direction that is orthogonal thereto.

Figure 2:
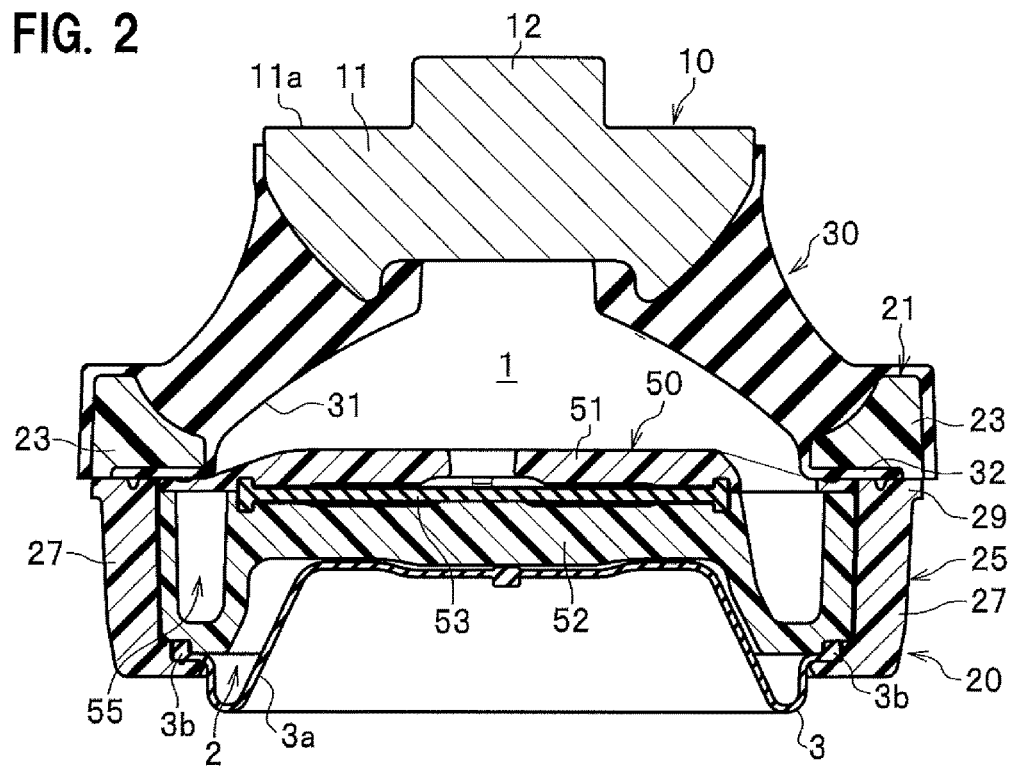
FIG. 2 is a cross-sectional view taken along a line A-A in FIG. 1.
Figure 3:
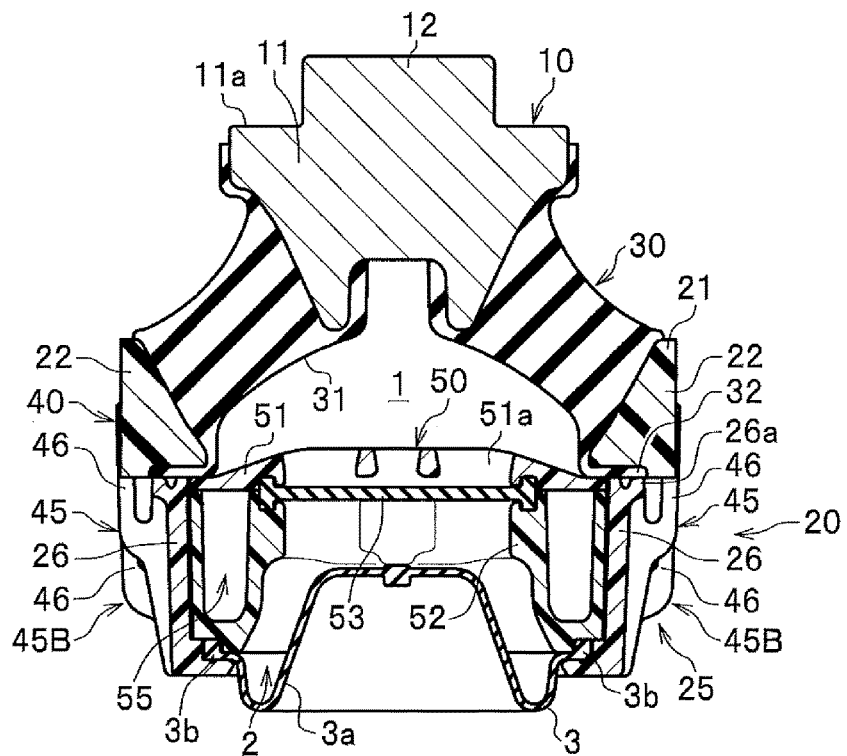
FIG. 3 is a cross-sectional view taken along a line B-B in FIG. 1.

The first mounting member 10 is integrally arranged on an upper portion of the insulator 30. The first mounting member 10 is made of, for example, an aluminum alloy. As shown in FIGS. 2 and 3, the first mounting member 10 includes: a base part 11 whose lower portion is embedded in the insulator 30; and a protruding part 12 that protrudes upward from the base part 11. The lower portion of the base part 11 is vulcanization-bonded to the insulator 30. Note that the shape of the protruding part 12 is not limited to the cylindrical shape, and various shapes can be adopted. Instead of forming the protruding part 12, a bolt hole may be formed in the base part 11 for fixing a bracket which is arranged on the engine (not shown).

As shown in FIGS. 2 and 3, the base part 11 is formed to have a shape in which cross-sectional shapes along the long side direction and the short side direction are both narrowed downward. The base part 11 has a flat seating surface 11a on which an engine bracket is placed.

As shown in FIG. 2, the insulator 30 has a recess 31. The recess 31 is open downward in FIG. 2 and is partitioned by a partitioning member 50 (upper plate 51) to form a main liquid chamber 1. An incompressible damping liquid is sealed in the recess 31. The lower part of the insulator 30 is fixed to a first frame 21 of the second mounting member 20. Details of the first frame 21 will be described later.

The main liquid chamber 1 is partitioned by the partitioning member 50 from an auxiliary liquid chamber 2. The main liquid chamber 1 and the auxiliary liquid chamber 2 communicate with each other via an orifice passage 55 (see FIGS. 2 and 3) which is formed in the outer peripheral of the partitioning member 50. The orifice passage 55 is set, for example, so as to resonate with low frequency vibration. The auxiliary liquid chamber 2 is formed between a diaphragm 3 and the partitioning member 50 to have the diaphragm 3 as a part of a wall.

The second mounting member 20 serves as an outer cylindrical member. The second mounting member 20 includes the first frame 21, a second frame 25, and a connector 40 (see FIG. 1).

As shown in FIGS. 2 and 3, the first frame 21 is a cylindrical frame which is connected to the lower portion (lower end) of the insulator 30. The second frame 25 is a cylindrical frame which holds the partitioning member 50 arranged below the insulator 30. The first frame 21 and the second frame 25 each have a substantially elongated rectangular cylindrical shape. Both of the first frame 21 and the second frame 25 are moldings of synthetic resin. The second mounting member 20 is fitted to a holder (not shown) so as to be mounted on the vehicle body, or mounted on the vehicle body side via a bracket (not shown).

As shown in FIG. 1, the connector 40 connects the first frame 21 with the second frame 25. The connector 40 includes: engaging parts 41 that are arranged on the first frame 21; and elastic hook parts 45 that are arranged on the second frame 25 so as to be engaged with the engaging parts 41. Each part will be described in detail below.

As shown in FIGS. 2 and 3, the first frame 21 has its inner surface inclined so as to expand (widen) upward from the lower portion. The first frame 21 includes a pair of right and left linear main frame parts 22, as shown in FIG. 3, and a pair of front and rear linear side frame parts 23 connecting the ends of the main frames 22, as shown in FIG. 2. As shown in FIG. 1, corners 24 (two corners on one side are shown in FIG. 1) between the adjacent main frame parts 22 and the side frame parts 23 are each formed in a round shape.

Figure 4:
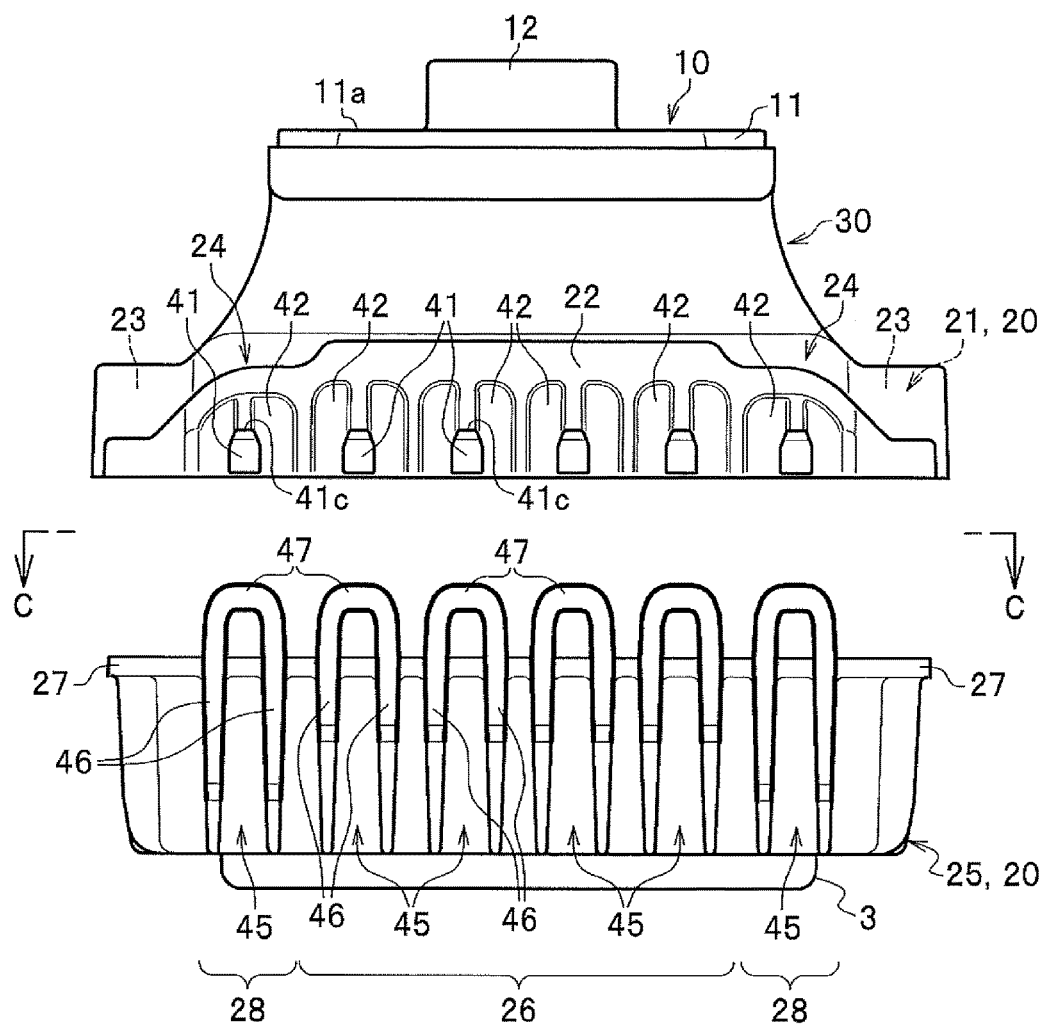
FIG. 4 is a side view of a first frame and a second frame that are disassembled.

As shown in FIG. 4, the first frame 21 has recesses 42 on its sides at predetermined intervals. The recesses 42 are arranged on the outer peripheral surfaces of the main frame parts 22 and on the corners 24. One side (left side) of the first frame 21 is arranged with, for example, four recesses 42 on the main frame part 22 and one recess on each of the corners 24. The other side (right side) of the first frame 21 is similarly arranged with the recesses 42.

The engaging part 41 is formed in each recess 42. Each engaging part 41 is formed to protrude laterally. An engaging surface 41c (see FIGS. 7A and 7B) is formed on the upper surface of each engaging part 41. The engaging surface 41c is engaged with a tip part 47, to be described later, of the elastic hook part 45 (see FIGS. 7C and 7D).

Figure 5:
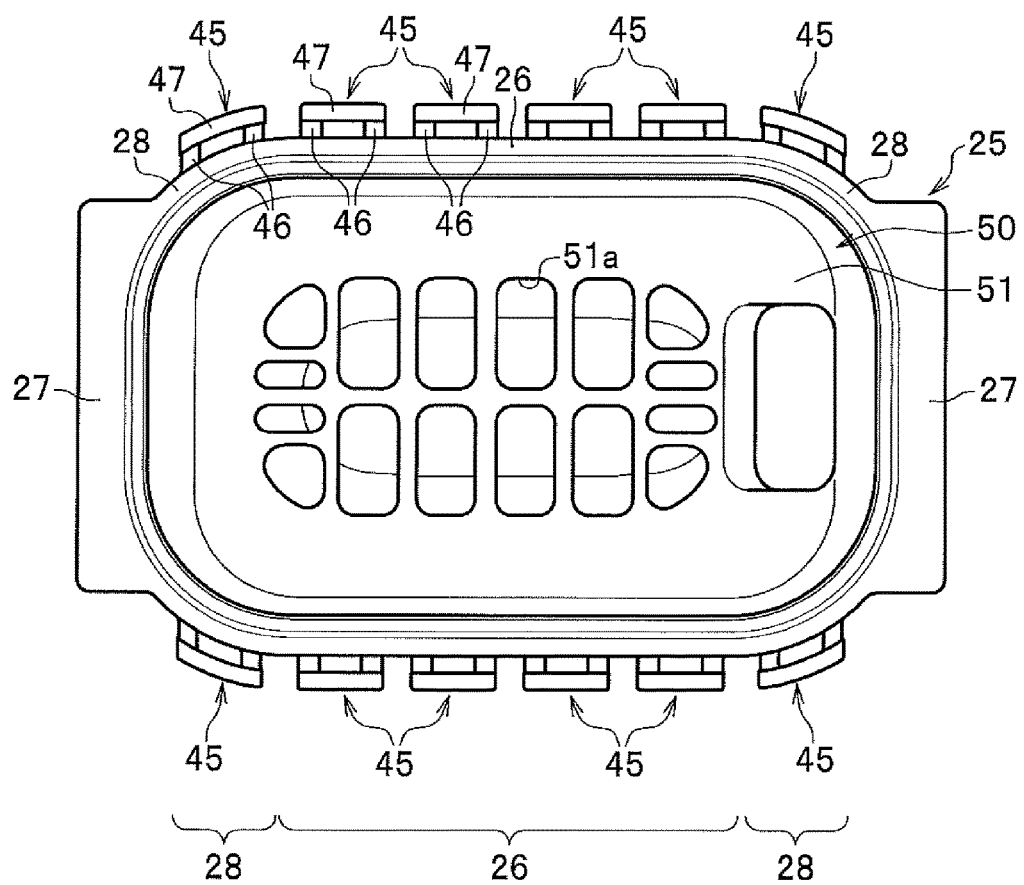
FIG. 5 is a diagram as viewed from an arrowed line C-C in FIG. 4.

As shown in FIG. 5, the second frame 25 has, in accordance with a form of the first frame 21, a pair of right and left linear main frame parts 26 (see FIG. 3) and a pair of front and rear linear side frame parts 27 (see FIG. 2). The corner 28 between the adjacent main frame part 26 and the side frame part 27 is formed in a round shape. The second frame 25 is formed, as shown in FIG. 5, such that the thickness of the main frame part 26 and the corner 28 are substantially the same.

The second frame 25 has the elastic hook parts 45 arranged on its side at predetermined intervals, as shown in FIG. 4. Each elastic hook part 45 is formed at a position to meet each engaging part 41 of the first frame 21. Specifically, one side (left side) of the second frame 25 is arranged with four elastic hook parts 45 on the outer peripheral surface of the main frame part 26 and one elastic hook part 45 on the outer peripheral surface of each of the corners 28. The other side (the right side) of the second frame 25 is similarly arranged with the elastic hook parts 45. The elastic hook parts 45 are engageable with the respective engaging parts 41 of the first frame 21 when the second mounting member 20 is mounted.

The elastic hook parts 45 are each formed in a substantially inverted U shape in a side view (see FIG. 1). The elastic hook part 45 includes a pair of front and rear legs 46 that extend toward the first frame 21, and the tip part 47 that connects tips of the legs 46 with each other.

Figure 6A:
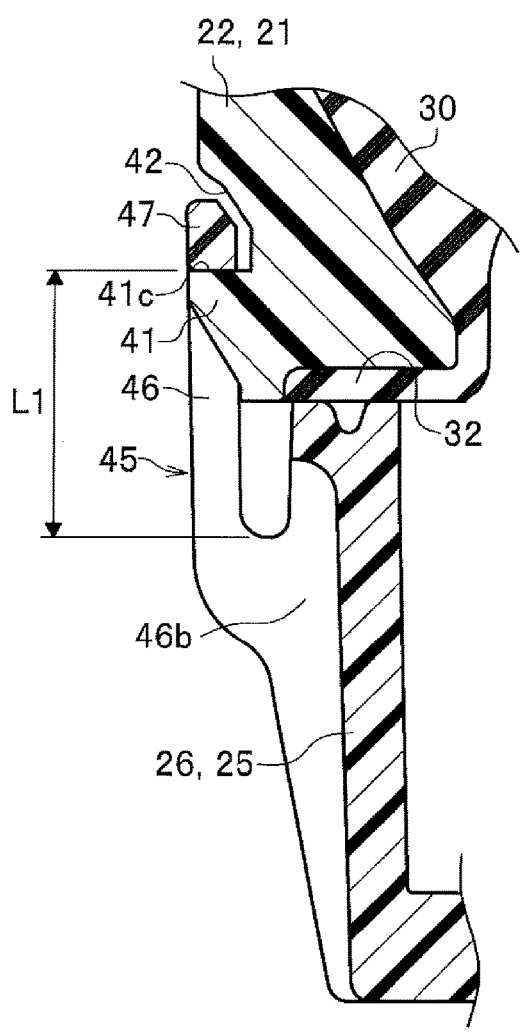
FIG. 6A is a cross-sectional view of an elastic hook part arranged at a linear section of a main frame being in an engaged state.

The legs 46 of the elastic hook part 45, which is arranged on the main frame part 26, each have a variable length L1 due to elastic deformation, as shown in FIG. 6A.

Figure 6B:
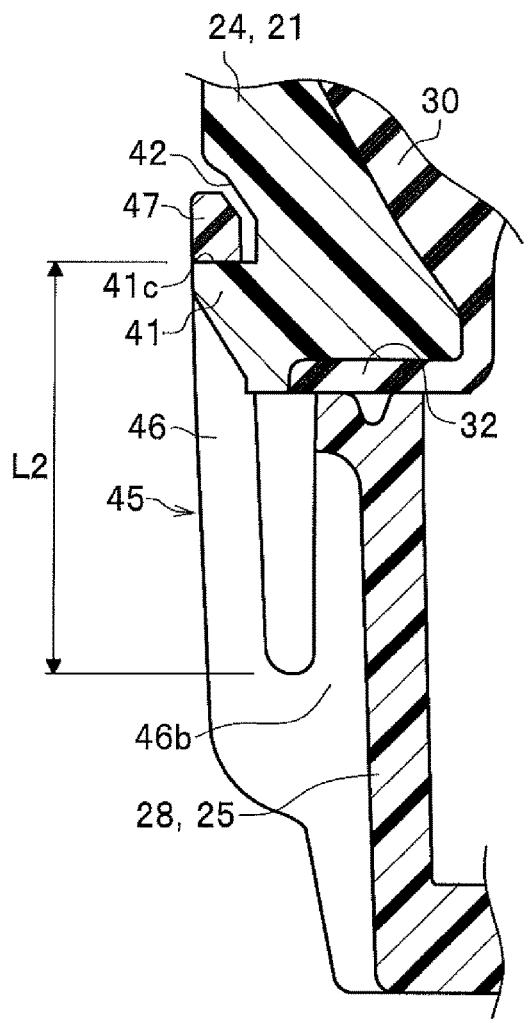
FIG. 6B is a cross-sectional view of the elastic hook part arranged on a corner of the main frame being in an engaged state.

On the other hand, the legs 46 of the elastic hook part 45, which is arranged on each of the corners 28, each have a variable length L2 due to elastic deformation, as shown in FIG. 6B. As shown in FIGS. 6A and 6B, when the length L1 is compared with the length L2, the length L2 is formed longer than the length L1. As a result, the leg 46 of the elastic hook part 45 on the corner 28 has lower rigidity than the leg 46 of the adjacent elastic hook part 45 on the main frame part 26, to allow the elastic hook part 45 on the corner 28 to be elastically deformed more easily than that on the main frame part 26. That is, the elastic hook part 45 arranged on a high-rigidity part (corner 28) has lower rigidity than that arranged on a low-rigidity part (main frame part 26). Making the lengths of the legs 46 different as described above allows the elastic hook part 45 itself on the high-rigidity part (corner 28) to have different elasticity from that on the low-rigidity part (main frame part 26).

As shown in FIGS. 6A and 6B, the lower ends of the legs 46 continue to the ribs 46b that extend on the second frame 25 in the up-down direction. This allows each leg 46 to have enough strength and to be elastically deformed in accordance with rigidity of the second frame 25 itself. That is, the elastic hook part 45 on the main frame part 26 (low rigidity part) is elastically deformed in accordance with rigidity of the main frame part 26, while the elastic hook part 45 on the corner 28 (high rigidity part) is elastically deformed in accordance with rigidity of the corner 28.

As shown in FIG. 3, an upper end 26a of the main frame part 26 assumes a flange to abut against the lower surface of the main frame part 22 of the first frame 21 and to sandwich an extending part 32 of the insulator 30 together with the main frame part 22. Also, an upper end 29 of the side frame part 27 assumes a flange, as shown in FIG. 2, to abut against the lower surface of the side frame part 23 of the first frame 21 and to sandwich the extending part 32 of the insulator 30 together with the side frame part 23. The extending part 32 of the insulator 30 positions the outer peripheral end of the upper surface of the partition member 50, and also serves as a sealing member.

The diaphragm 3 includes a thin main body 3a, and a seal part 3b that is integrally formed on the outer peripheral end of the main body 3a. The seal part 3b is mounted on the outer peripheral end of the lower surface of the partitioning member 50 to be interposed between the second frame 25 and the partitioning member 50.

The partitioning member 50 is formed in a substantially quadrangular shape in a plan view, as shown in FIG. 5, corresponding to the shape of the second frame 25. The partitioning member 50 is configured, as shown in FIGS. 2 and 3, to sandwich an elastic partitioning member 53 between an upper plate 51 and a lower holder 52.

In order to assemble the liquid-sealed vibration damping device, a small assembly is made first in which the diaphragm 3 and the partitioning member 50 are housed in the second frame 25. Additionally, another small assembly is made in which the first mounting member 10, the insulator 30, and the first frame 21 are integrated, and is brought closer to the second frame 25 from above.

Figure 7A:
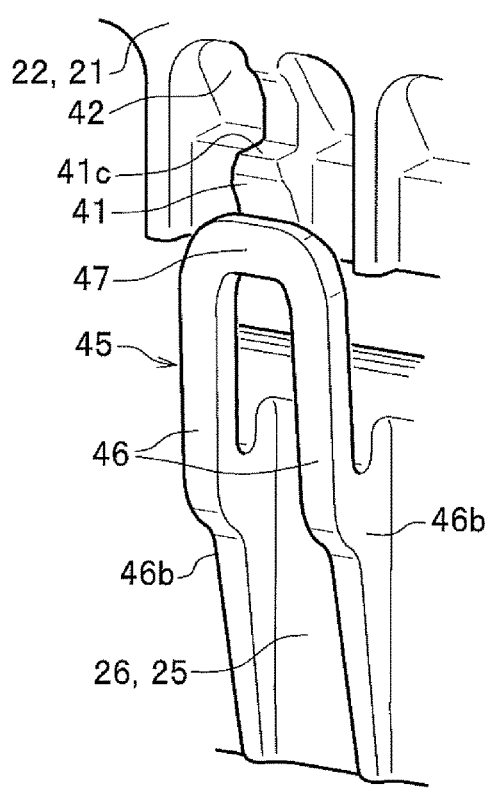
FIG. 7A is a perspective view of the elastic hook part arranged at the linear section of the main frame before being engaged.
Figure 7B:
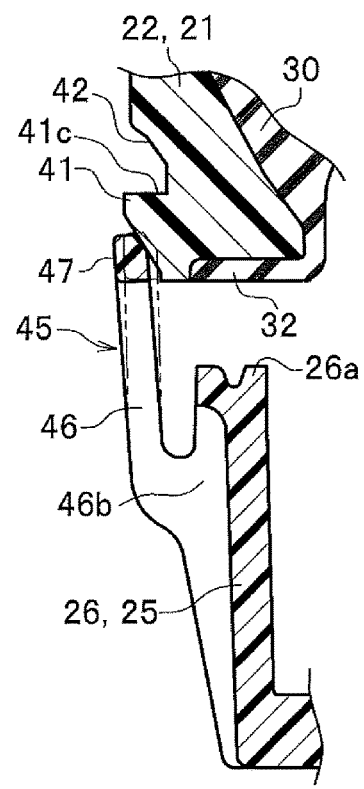
FIG. 7B is a cross-sectional view of the elastic hook part arranged at the linear section of the main frame before being engaged.
Figure 7C:
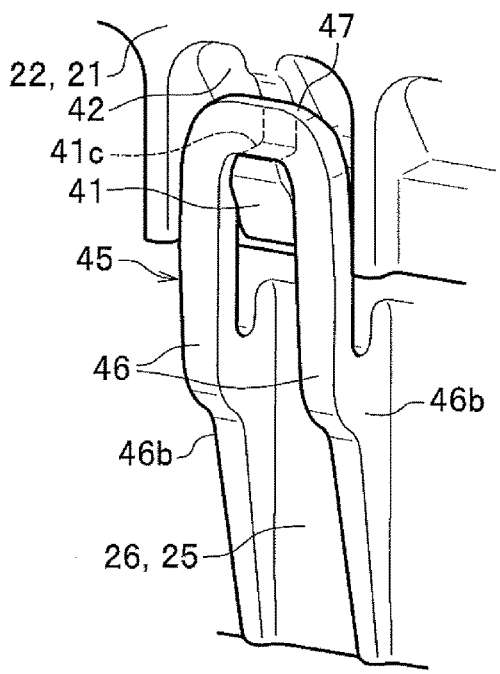
FIG. 7C is a perspective view of the elastic hook part arranged at the linear section of the main frame after being engaged.
Figure 7D:
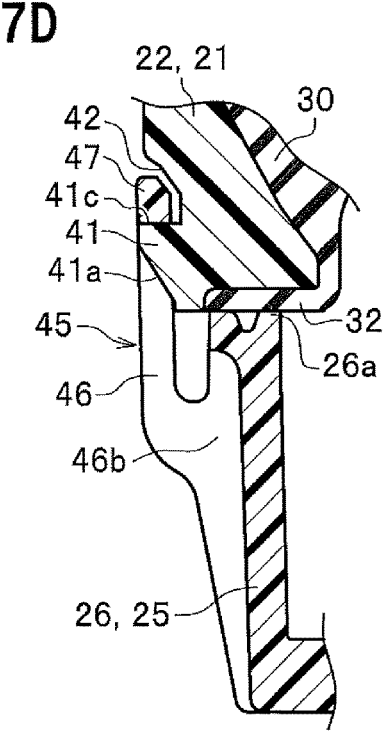
FIG. 7D is a cross-sectional view of the elastic hook part arranged at the linear section of the main frame after being engaged.

Then, the tip part 47 of the elastic hook part 45 of the second frame 25 abuts against the engaging part 41 of the first frame 21 with elasticity, as shown in FIGS. 7A and 7B, to make the elastic hook part 45 elastically deform outward (laterally). The first frame 21 is further brought closer to the second frame 25, as shown in FIGS. 7C and 7D, to make the lower surface of the first frame 21 (extending part 32; see FIG. 7D) abuts against the upper surface of the second frame 25 (upper end 26a; see FIG. 7D). Then, the elastic hook part 45 is elastically restored to make the tip end 47 enter the recess 42 so as to be engaged with the engaging surface 41c of the engaging part 41.

The tip ends 47 of the elastic hook parts 45 are engaged with the respective engaging parts 41 to integrally assemble the second mounting member 20.

According to the liquid-sealed vibration damping device of the present embodiment as described above, the engaging parts 41 arranged on the first frame 21 are engaged with the elastic hook parts 45 arranged on the second frame 25 to facilitate assembling the second mounting member 20. In addition, the elastic hook part 45 having high rigidity is arranged on the main frame part 26 (low rigidity part) having low rigidity for a frame, and the elastic hook part 45 having low rigidity is arranged on the corner 28 (high rigidity part) having high rigidity for a frame, to allow the elastic hook parts 45 practically to have uniform rigidity in the circumferential direction of the frame. Therefore, the liquid-sealed vibration damping device allows the first frame 21 and the second frame 25 to have a substantially uniform interference margin in the circumferential direction (the interference margin is balanced in the circumferential direction).

Second Embodiment

A second embodiment of the present disclosure will be described with reference to FIGS. 8A and 8B. The liquid-sealed vibration damping device of the second embodiment is different from the first embodiment on the point that a thickness D2 of the elastic hook part 45 arranged on the corner 28 is made different from a thickness D1 of the elastic hook part 45 arranged on the main frame part 26.

Figure 8A:
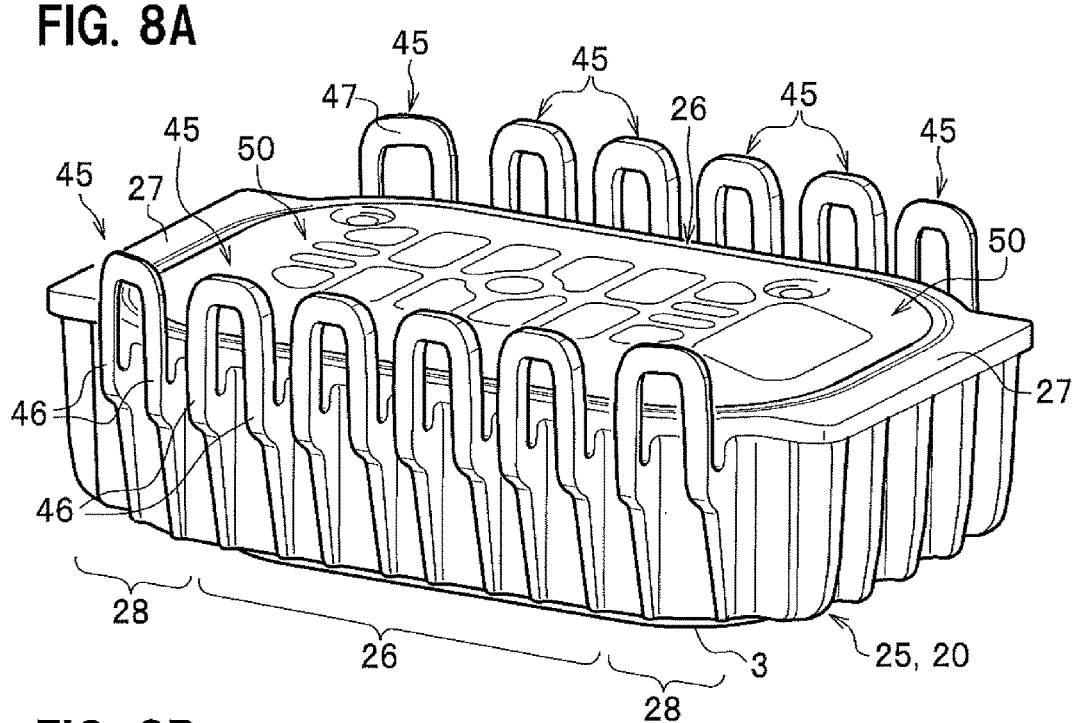
FIG. 8A is a perspective view of a second frame of a liquid-sealed vibration damping device according to a second embodiment.
Figure 8B:
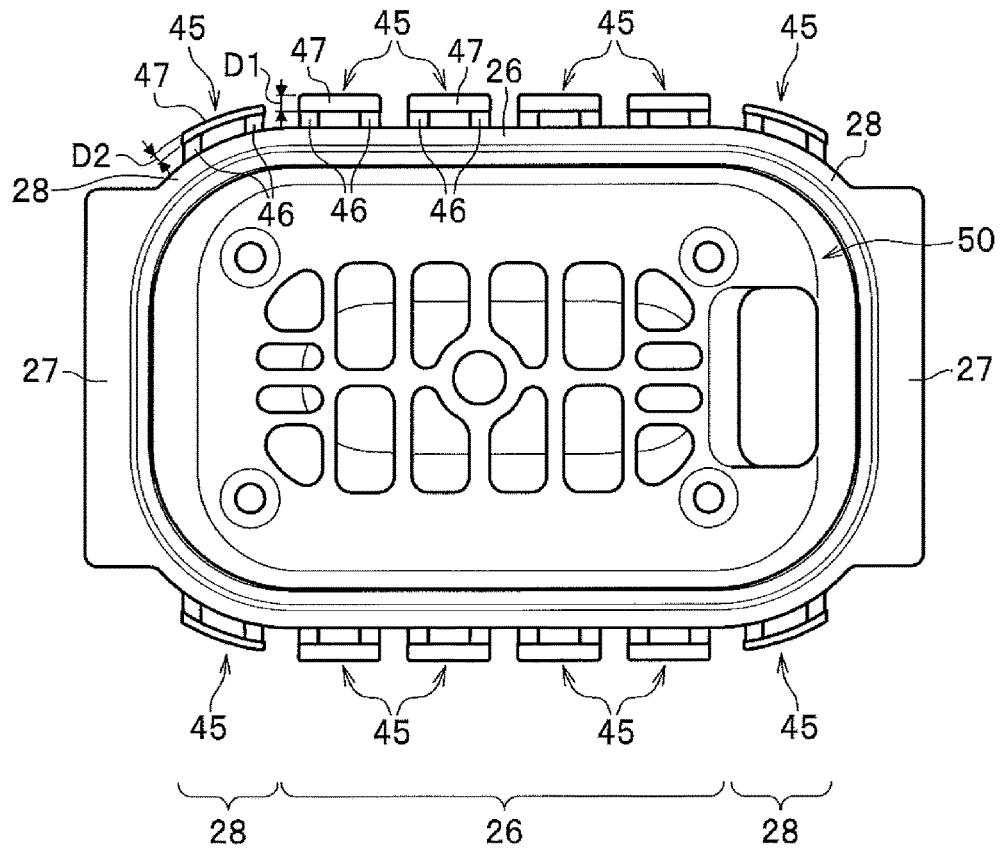
FIG. 8B is a plan view of a second frame of a liquid-sealed vibration damping device according to a second embodiment.

As shown in FIG. 8A, all the elastic hook parts 45 have the legs 46 having the same length. The thickness D2 of the elastic hook part 45 on the corner 28 is formed thinner than the thickness D1 of the elastic hook part 45 on the main frame part 26 (see FIG. 8B). As a result, the elastic hook part 45 on the corner 28 has lower rigidity than that on the main frame part 26. That is, the elastic hook part 45 arranged on the corner 28 (high rigidity part) having high rigidity is elastically deformed more easily than that arranged on the main frame part 26 (low rigidity part) having low rigidity.

Also in the present embodiment, the same functional effect is achieved as with the first embodiment. That is, the engaging parts 41 arranged on the first frame 21 are engaged with the respective elastic hook parts 45 arranged on the second frame 25 to facilitate assembling the second mounting member 20.

Third Embodiment

A third embodiment of the present disclosure will be described with reference to FIGS. 9A and 9B. The liquid-sealed vibration damping device of the third embodiment is different from those of the first and second embodiments on the point that the elastic hook parts 45 are arranged only on the main frame part 26.

Figure 9A:
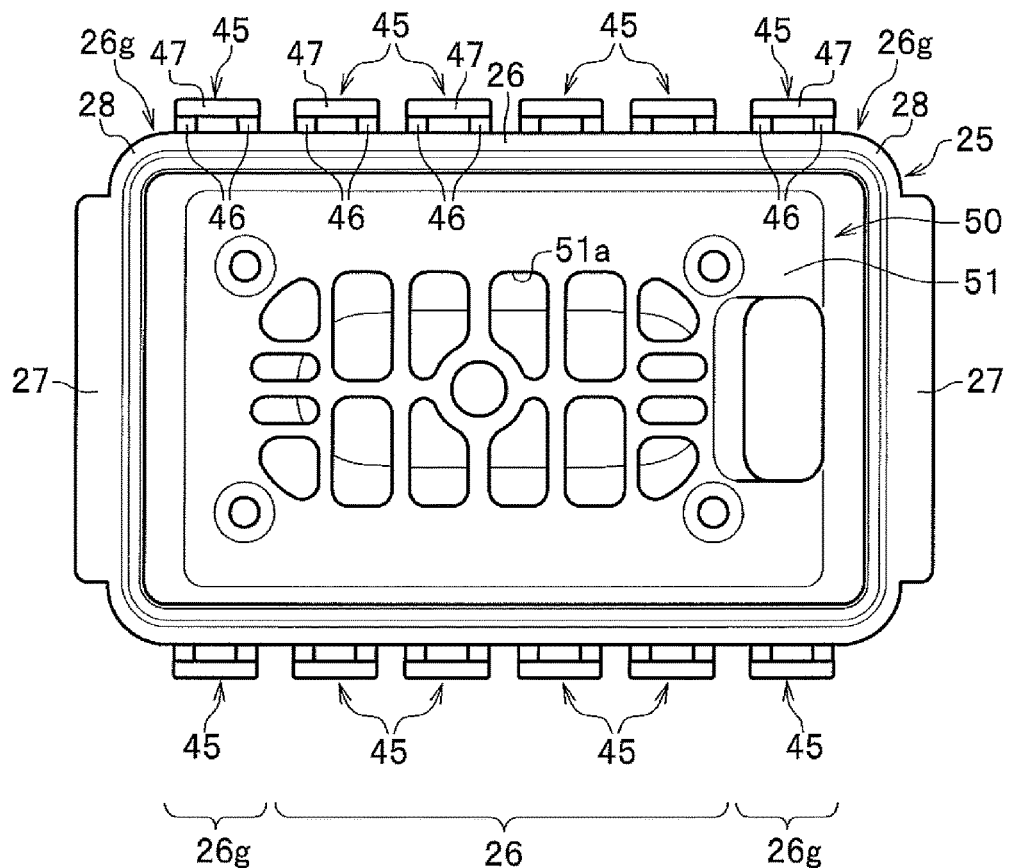
FIG. 9A is a plan view of a second frame of a liquid-sealed vibration damping device according to a third embodiment.

As shown in FIG. 9A, the second frame 25 has a pair of linear main frame parts 26 facing each other, and a pair of side frame parts 27 connecting the respective ends of the main frame parts 26. The corner 28 between the main frame part 26 and the side frame part 27 is formed to have a smaller radius than that of the first or second embodiment. The elastic hook parts 45 are arranged at intervals in the circumferential direction of the second frame 25, but only on the main frame parts 26. The first frame 21, although not shown, has a shape corresponding to the second frame 25. The first frame 21 is arranged with the engaging parts 41 to be engaged with the respective elastic hook parts 45.

Figure 9B:
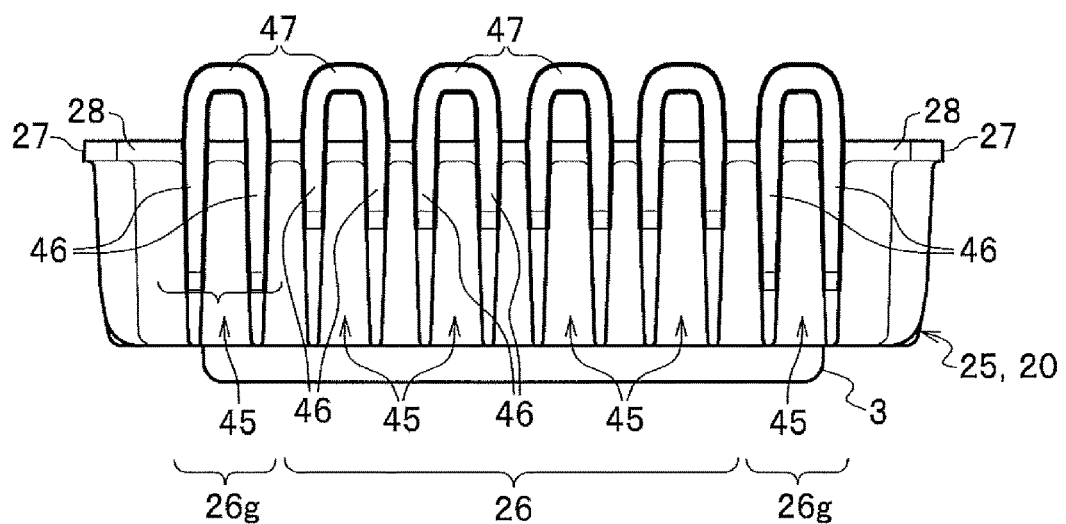
FIG. 9B is a side view of a second frame of a liquid-sealed vibration damping device according to a third embodiment.

As shown in FIG. 9B, the length L2 (not shown; similar to the first embodiment) of the leg 46 of the elastic hook part 45 arranged at an end part 26g of the main frame part 26 is formed longer than the length L1 (not shown; similar to the first embodiment) of the leg 46 of the elastic hook part 45 arranged at a position away from the end part 26g. As a result, the leg 46 of the elastic hook part 45 at the end part 26g has lower rigidity than the leg 46 of the elastic hook part 45 arranged at a position away from the end part 26g, so as to be elastically deformed more easily. That is, the elastic hook part 45 arranged at the end part 26g as a high rigidity part has lower rigidity than that arranged at a position away from the end part 26g as a low rigidity part. As described above, in the present embodiment, making the lengths of the legs 46 different between one at the end part 26g and one at a position away from the end part 26g on the main frame part 26 allows the elastic hook part 45 itself to have different elasticity.

Also in the present embodiment, the same functional effect is achieved as with the first embodiment. That is, the engaging parts 41 arranged on the first frame 21 are engaged with the respective elastic hook parts 45 arranged on the second frame 25 to facilitate assembling the second mounting member 20.

Hereinabove, the embodiments of the present disclosure have been described, but the present disclosure is not limited to the above-described embodiments and those may variously be modified.

Figure 10:
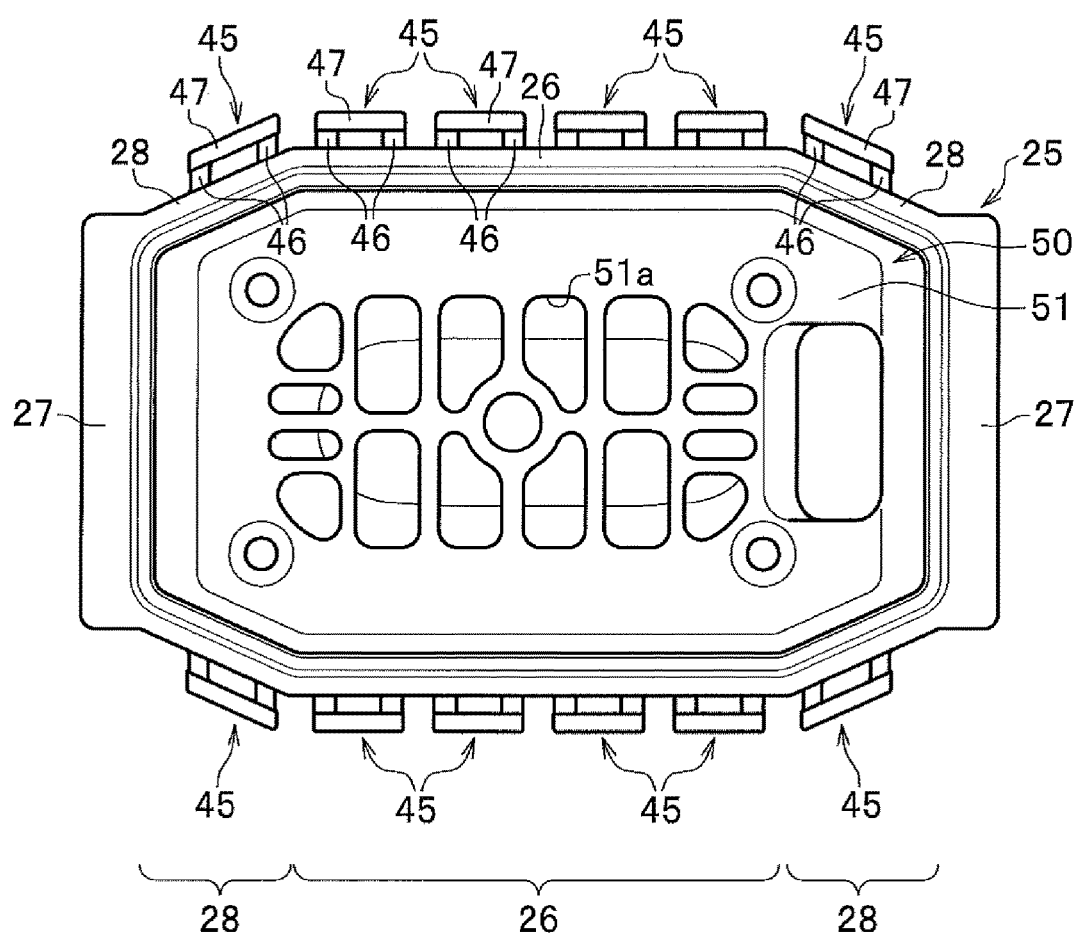
FIG. 10 is a plan view of a second frame of a first modification of the liquid-sealed vibration damping device.

For example, the corners 28 in a round shape are provided in the above-described embodiments, but the shape is not limited thereto and the corner 28 may be formed to have a linear shape, as shown in a first modification in FIG. 10. Even in this case, the same functional effect is achieved as with the first embodiment.

Figure 11:
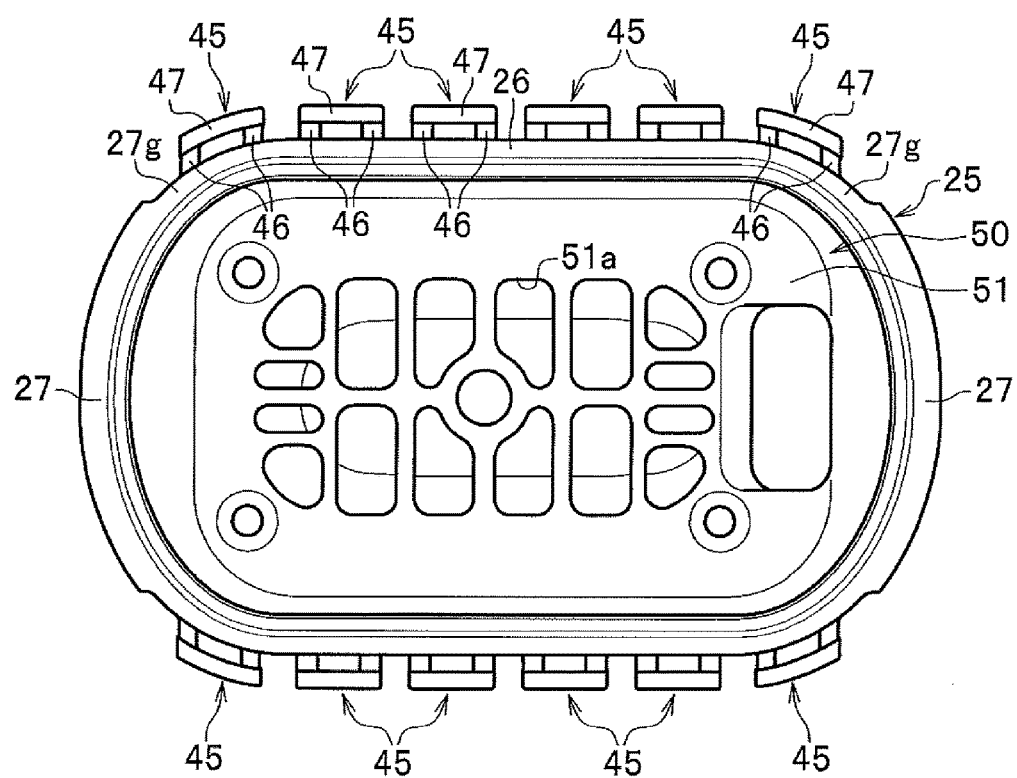
FIG. 11 is a plan view of a second frame of a second modification of the liquid-sealed vibration damping device.

In addition, the side frame part 27 may be formed to have an arc shape, as shown in a second modification in FIG. 11. In this case, the elastic hook parts 45 having low rigidity are arranged at both end parts 27g (high rigidity parts) of the side frame part 27, which are adjacent to the main frame parts 26. This allows the elastic hook parts 45 practically to have uniform rigidity in the circumferential direction of the frame, as with the first embodiment.

Further, the second mounting member 20 may be formed to have an elliptical shape, a polygonal shape, a triangular shape, or the like in a plan view. In this case, the elastic hook part 45 having low rigidity is arranged on a high rigidity part of the frame and the elastic hook part 45 having high rigidity is arranged on a low rigidity part of the frame. This allows the elastic hook parts 45 practically to have uniform rigidity in the circumferential direction of the frame, as with the first embodiment.

Furthermore, even when the shape of the second mounting member 20 is formed to have a shape, in a plan view, other than those described above, the elastic hook part 45 having low rigidity is arranged on a high rigidity part of the frame, and the elastic hook part 45 having high rigidity is arranged on a low rigidity part of the frame. This allows the elastic hook parts 45 practically to have uniform rigidity in the circumferential direction of the frame, as with the first embodiment.

Figure 12:
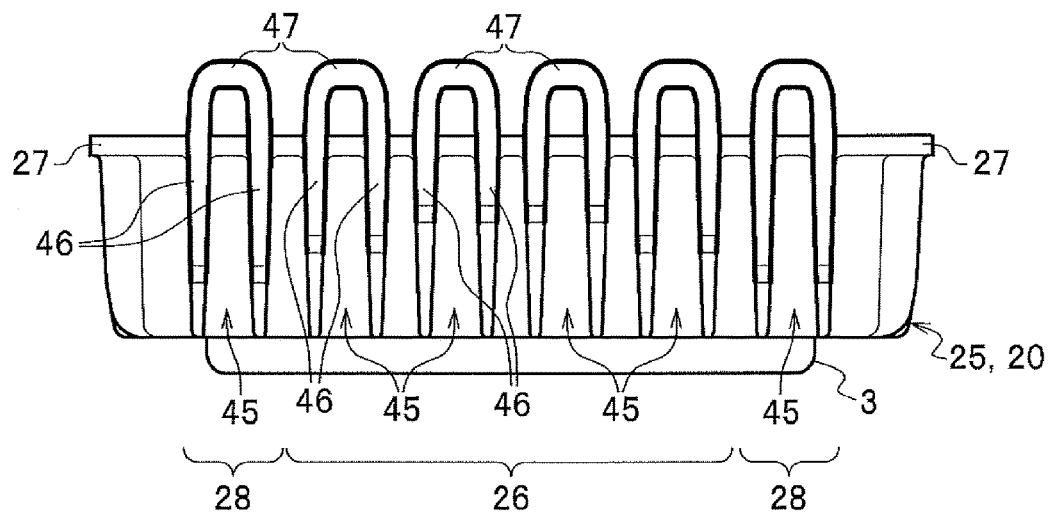
FIG. 12 is a side view of a second frame of a third modification of the liquid-sealed vibration damping device.

Moreover, as shown in a third modification in FIG. 12, the legs 46 may be formed longer as they are closer to the both ends of the main frame part 26 and shorter as they are closer to the center thereof, in accordance with the level of rigidity of the main frame part 26 in the front-rear direction (longitudinal direction). This allows the elastic hook parts 45 practically to have uniform rigidity further in the circumferential direction of the frame.

Figure 13:
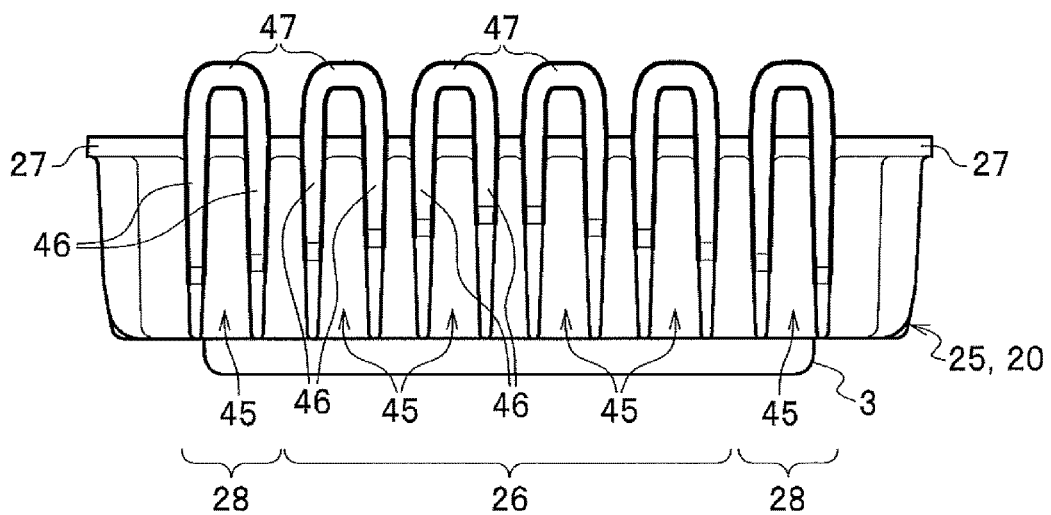
FIG. 13 is a side view of a second frame of a fourth modification of the liquid-sealed vibration damping device.

Still moreover, as shown in a fourth modification in FIG. 13, the right and left legs 46 of the elastic hook part 45 may be formed such that one located closer to the corner 28 (high rigidity part) is formed to have a longer length than the other.

Still moreover, in the above-described embodiments, the engaging parts 41 are arranged on the first frame 21 and the elastic hook parts 45 are arranged on the second frame 25, but the present disclosure is not limited to this, and conversely, the elastic hook parts 45 may be arranged on the first frame 21 and the engaging parts 41 may be arranged on the second frame 25.

Still moreover, the present disclosure is not limited to a vehicle using an engine as the vibration source, and are also broadly applicable to a vehicle using a motor as the vibration source.

The invention claimed is:
1. A liquid-sealed vibration damping device comprising:
a first mounting member that is mounted on a vibration source;
a second mounting member that is mounted on a non-vibration source; and
an insulator that is interposed between the first and second mounting members, wherein the second mounting member includes:
  a first frame in a cylindrical shape that is connected to a lower portion of the insulator;
  a second frame in a cylindrical shape that holds a partition member which is arranged below the insulator; and
  a connector that connects the first frame with the second frame,
wherein the connector includes:
  engaging parts that are arranged on either one of the first and second frames; and
  elastic hook parts that are arranged on the other one of the first and second frames to engage with the engaging parts, and
the first or second frame, which is arranged with the elastic hook parts, includes:
  a pair of main frame parts in a linear shape that faces each other; and
  a pair of side frame parts that connects ends of the main frame parts,
wherein the elastic hook parts are arranged at intervals on each of the main frame parts in the circumferential direction of the said first or second frame, and are also arranged on corners between the main frame parts and the side frame parts,
wherein the elastic hook parts arranged on the corners have lower rigidity than those arranged on the main frame parts.

2. The liquid-sealed vibration damping device according to claim 1,
wherein the elastic hook part includes: a leg part that extends toward the engaging part; and a tip part that is arranged at a tip of the leg part and engaged with the engaging part, and
the elastic hook part having low rigidity is formed to have a longer leg part than that having higher rigidity.

3. The liquid-sealed vibration damping device according to claim 1,
wherein the elastic hook part having low rigidity is formed thinner than that having higher rigidity.

4. A liquid-sealed vibration damping device comprising:
a first mounting member that is mounted on a vibration source;
a second mounting member as an outer cylindrical member that is mounted on a non-vibration source; and
an insulator that is interposed between the first and second mounting members,
wherein the second mounting member includes:
  a first frame in a cylindrical shape that is connected to a lower portion of the insulator;
  a second frame in a cylindrical shape that holds a partition member which is arranged below the insulator; and
  a connector that connects the first frame with the second frame,
wherein the connector includes:
  engaging parts that are arranged on either one of the first and second frames; and
  elastic hook parts that are arranged on the other one of the first and second frames to engage with the engaging parts, and
the first or second frame, which is arranged with the elastic hook parts, includes:
  a pair of main frame parts in a linear shape that faces each other; and
  a pair of side frame parts that connects ends of the main frame parts,
wherein the elastic hook parts are arranged at intervals on each of the main frame parts in the circumferential direction of the said first or second frame, and among the elastic hook parts, the elastic hook parts arranged at the ends of the main frames have lower rigidity than those arranged at positions away from the ends.

5. The liquid-sealed vibration damping device according to claim 4,
wherein the elastic hook part includes: a leg part that extends toward the engaging part; and a tip part that is arranged at a tip of the leg part and engaged with the engaging part, and
the elastic hook part having low rigidity is formed to have a longer leg part than that having higher rigidity.

6. The liquid-sealed vibration damping device according to claim 4,
wherein the elastic hook part having low rigidity is formed thinner than that having higher rigidity.

7. A liquid-sealed vibration damping device comprising:
a first mounting member that is mounted on a vibration source;
a second mounting member as an outer cylindrical member that is mounted on a non-vibration source; and
an insulator that is interposed between the first and second mounting members,
wherein the second mounting member includes:
  a first frame in a cylindrical shape that is connected to a lower portion of the insulator;
  a second frame in a cylindrical shape that holds a partition member which is arranged below the insulator; and
  a connector that connects the first frame with the second frame,
wherein the connector includes:
  engaging parts that are arranged on either one of the first and second frames; and
  elastic hook parts that are arranged on the other one of the first and second frames to engage with the engaging parts, and
the first or second frame, which is arranged with the elastic hook parts, includes:
  a low rigidity part having low rigidity; and
  a high rigidity part having high rigidity than the low rigidity part,
wherein the elastic hook parts are arranged at intervals on the said first or second frame, which is arranged with the elastic hook parts, in the circumferential direction thereof, and the elastic hook parts arranged on the high rigidity part have lower rigidity than those arranged on the low rigidity part.

8. The liquid-sealed vibration damping device according to claim 7,
wherein the elastic hook part includes: a leg part that extends toward the engaging part; and a tip part that is arranged at a tip of the leg part and engaged with the engaging part, and
the elastic hook part having low rigidity is formed to have a longer leg part than that having higher rigidity.

9. The liquid-sealed vibration damping device according to claim 7,
wherein the elastic hook part having low rigidity is formed thinner than that having higher rigidity.

* * * * *